April 18, 1967 — J. E. STYERS — 3,314,460

NUTCRACKER

Filed April 15, 1964

INVENTOR.
JOHN E. STYERS
BY Kimmel & Crowell
ATTORNEYS.

United States Patent Office 3,314,460
Patented Apr. 18, 1967

3,314,460
NUTCRACKER
John E. Styers, Salem, Oreg., assignor to
Mardell Ellis, Salem, Oreg.
Filed Apr. 15, 1964, Ser. No. 359,847
4 Claims. (Cl. 146—13)

This invention relates to a nutcracker and more particularly to a device adapted to crack the shell from a nut without damaging the nut meat.

A primary object of the instant invention is the provision of a nutcracker which is sturdy and durable in construction, reliable and efficient in operation, and relatively simple and inexpensive to manufacture, assemble, utilize, and maintain.

Another object of this invention is the provision of a nutcracker having a pair of opposed jaw means adapted to receive a nut therebetween with edge portions of the jaw means cracking the ends of the shell of the nut to allow the nut meat to be removed therefrom, the jaw means being limited in their movement toward each other to preclude damage to the nut meat.

A further object of the instant invention is the provision of a device of the type described having additional jaw means between its handle members whereby a nut may be selectively cracked in either of two places depending upon the characteristics of the nut.

Other and further objects reside in the combination of elements, arrangement of parts, and features of construction.

Still other objects will in part be obvious and in part be pointed out as the description of the invention proceeds and as shown on the accompanying drawing wherein.

Similar reference characters refer to similar parts throughout the several views of the drawing.

Figure 1:
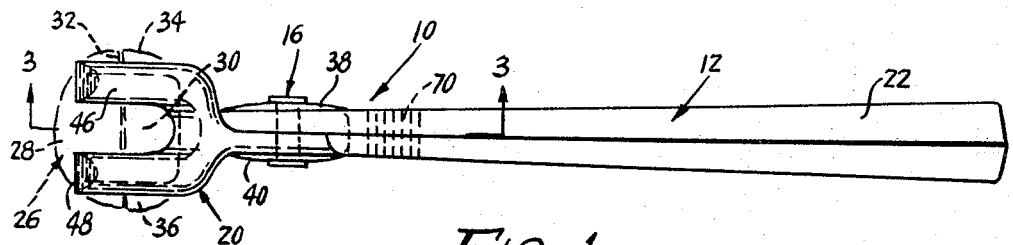
FIGURE 1 is a top plan view of the nutcracker of the instant invention showing a walnut or the like interposed between its primary jaw means in dotted lines.
Figure 2:
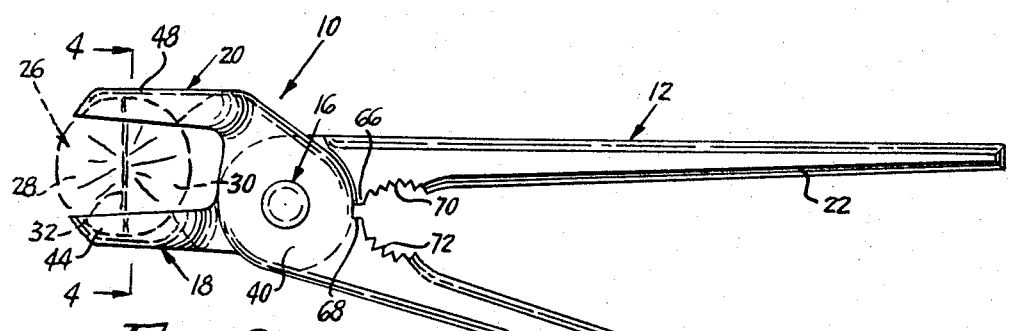
FIGURE 2 is a side elevational view of the nutcracker showing the jaws in an intermediate position immediately before cracking the shell of the nut.
Figure 3:
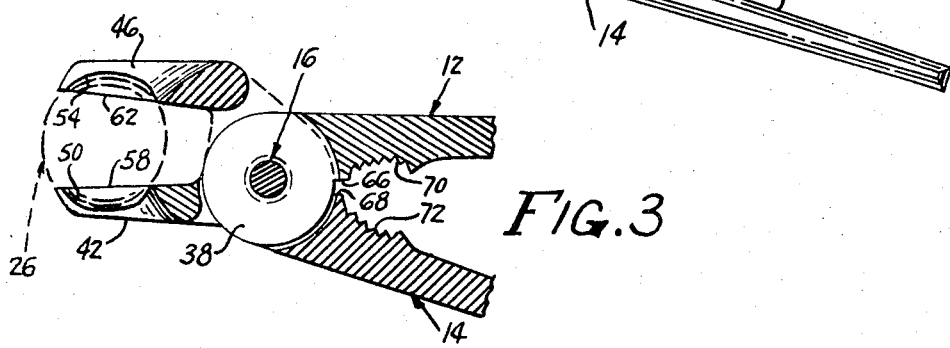
FIGURE 3 is a fragmentary transverse cross-sectional view taken substantially on lines 3—3 of FIGURE 1.
Figure 4:
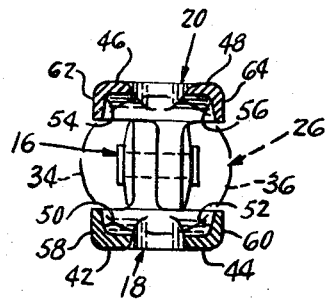
FIGURE 4 is a transverse cross-sectional view taken substantially along lines 4—4 of FIGURE 2.

Referring now to the drawing in general, a nutcracker in accordance with the instant inventive concept is designated generally by the reference numeral 10 and comprises basically a pair of leg members 12, 14 connected intermediate their end portions in crossing relationship by a pivot means 16, with the end portions of the leg members 12, 14 on one side of the pivot means 16 defining opposed jaw means 18, 20, and the end portions of the leg members 12, 14 on the opposite side of the pivot means 16 being elongated and defining handle members 22, 24 actuable to operate the nutcracker 10.

The nutcracker 10 is particularly designed for use with a nut such as a walnut or the like shown in dotted lines at 26 having two half shells 28, 30 meeting at a parting line 32 with a nut meat (not shown) within the half shells 28, 30. Such a nut 26 is substantially oval as seen in FIGURE 1 and has opposite ends 34, 36.

The leg members 12, 14 have enlarged intermediate bosses 38, 40 rotatably secured to each other by the pivot means 16 which may take the form of a rivet or the like.

Each jaw means 18, 20 includes a bifurcated element having spaced arm members 42, 44 and 46, 48, respectively, the arm members each having a recessed portion 50, 52 and 54, 56, disposed toward the center of its respective jaw means, and an upstanding side edge portion 58, 60 and 62, 64, respectively. The recessed portions 50, 52, 54, and 56 and the spaces between the arm members 42, 44, and 46, 48 together define a nut receiving cavity in which the major portion of the nut 26 rests during operation of the nutcracker 10. The upstanding side edge portions 58, 60, 62, and 64 together define shell cracking flanges which function in a manner to be more particularly pointed out hereinafter.

The leg members 12, 14 each include opposed lug elements 66, 68 adjacent the pivot means which engage each other when the handle members 22, 24 are moved together to crack the shell of a nut, these stop means limiting the movement of the jaw means 18, 20 to preclude damage to the nut meat.

Each leg member 12, 14 also includes portions in juxtaposition to the pivot means 16 defining additional jaw members 70, 72 adapted to crush or crack the shell of a nut received therebetween when the handle members 22, 24 are moved toward each other.

The use and operation of the nutcracker of the instant invention will now be apparent. The leg members 12, 14 are movable about the pivot means 16 between an open position wherein the handle members 22, 24 and hence the jaw means 18, 20 are spaced farthest from each other in order that a nut 26 may be placed in the nut receiving cavity defined by the recesses 50, 52, 54, and 56 and the spaces between the arm members 42, 44 and 46, 48, and a closed position wherein the shell cracking flanges 58, 60, 62, and 64 on the opposed jaw means 18, 20 engage the ends 34, 36 of the shell of the nut 26 to crack the same. The lug elements 66, 68 interposed between the leg members 12, 14, limit the movement of the jaw means 18, 20 toward each other in the closed position to preclude damage to the meat of the nut 26. Smaller nuts or nuts having different characteristics from walnuts or the like may be selectively cracked between the additional jaw means 70, 72 in an obvious manner.

It will now be seen that there is herein provided an improved nutcracker which satisfies all of the objectives of the instant invention, and others, including many advantages of great practical utility and commercial importance.

Since many embodiments may be made of the instant inventive concept, and since many modifications may be made of the embodiments hereinbefore shown and described, it is to be understood that all matter herein is to be interpreted merely as illustrative, and not in a limiting sense.

I claim:

1. A nutcracker comprising a pair of leg members each having opposite end portions, pivot means connecting said leg members intermediate said end portions in crossing relationship, the end portions of said leg members on one side of said pivot means defining opposed jaw means, said jaw means including portions defining a nut receiving cavity and opposite edge portions defining shell cracking flanges, said leg members being movable about said pivot means between an open position wherein a nut may be placed in said nut receiving cavity with the opposite ends of its shell extending across the edge portions of one jaw means, and a closed position wherein said shell cracking flanges on said opposed jaw means engage the ends of the shell to crack the same, each of said jaw means comprising a bifurcated element having spaced arm members, each arm member having a recessed portion disposed toward the center of the jaw means, and an upstanding side edge portion, the recessed portions of the arm members and the spaces therebetween defining said nut receiving cavity, and said upstanding side edge portions taken together defining said shell cracking flanges.

2. The structure of claim 1 wherein said pivot means interconnect said leg members adjacent said jaw means, the end portions of said leg members on the side of said pivot means opposed to said jaw means being elongated and defining handle members actuable to operate said nutcracker.

3. The structure of claim 2 and stop means including opposed lug elements carried by said handle members adjacent said pivot means, said lug elements engaging each other in said closed position and thereby limiting the movement of said jaw means towards each other.

4. The structure of claim 3 wherein portions of said handle members in juxtaposition to said pivot means define opposed additional jaw members actuable, when said leg members are moved to said closed position, to crack the shell of a nut placed therebetween.

References Cited by the Examiner

UNITED STATES PATENTS

| 1,085,461 | 1/1914 | Michaelis | 81—419 |
| 1,219,830 | 3/1917 | Marsh | 146—13 |
| 2,218,607 | 10/1940 | Gantz | 146—13 X |
| 2,608,891 | 9/1952 | Haussler | 81—5.1 |

FOREIGN PATENTS

| 1,044,178 | 6/1953 | France. |

WILLIAM W. DYER, Jr., *Primary Examiner.*

W. GRAYDON ABERCROMBIE, *Examiner.*